No. 753,123. PATENTED FEB. 23, 1904.
A. D. COLEMAN.
AUTOMATIC VACUUM AND SUCTION FEED MECHANISM.
APPLICATION FILED MAR. 18, 1901.
NO MODEL. 7 SHEETS—SHEET 2.

No. 753,123. PATENTED FEB. 23, 1904.
A. D. COLEMAN.
AUTOMATIC VACUUM AND SUCTION FEED MECHANISM.
APPLICATION FILED MAR. 18, 1901.
NO MODEL. 7 SHEETS—SHEET 3.

No. 753,123. PATENTED FEB. 23, 1904.
A. D. COLEMAN.
AUTOMATIC VACUUM AND SUCTION FEED MECHANISM.
APPLICATION FILED MAR. 18, 1901.
NO MODEL. 7 SHEETS—SHEET 4.

WITNESSES
INVENTOR
Arnold D. Coleman
By Charles W. Hill
Atty

No. 753,123. PATENTED FEB. 23, 1904.
A. D. COLEMAN.
AUTOMATIC VACUUM AND SUCTION FEED MECHANISM.
APPLICATION FILED MAR. 18, 1901.
NO MODEL. 7 SHEETS—SHEET 5.

No. 753,123. PATENTED FEB. 23, 1904.
A. D. COLEMAN.
AUTOMATIC VACUUM AND SUCTION FEED MECHANISM.
APPLICATION FILED MAR. 18, 1901.
NO MODEL. 7 SHEETS—SHEET 6.

No. 753,123.　　　　　　　　　　　　　　　　　　Patented February 23, 1904.

UNITED STATES PATENT OFFICE.

ARNOLD D. COLEMAN, OF CHICAGO, ILLINOIS.

AUTOMATIC VACUUM AND SUCTION FEED MECHANISM.

SPECIFICATION forming part of Letters Patent No. 753,123, dated February 23, 1904.

Application filed March 18, 1901. Serial No. 51,746. (No model.)

*To all whom it may concern:*

Be it known that I, ARNOLD D. COLEMAN, a citizen of the United States, and a resident of Chicago, in the county of Cook and State of Illinois, have invented certain new and useful Improvements in Automatic Vacuum and Suction Feed Mechanism; and I do hereby declare that the following is a full, clear, and exact description thereof, reference being had to the accompanying drawings, and to the letters of reference marked thereon, which form a part of this specification.

This invention relates to improvements in automatic vacuum and suction feed mechanism and is shown in relation with a can-body machine similar to that for which Letters Patent No. 598,567 issued February 8, 1898, to J. L. Board. Said can-body machine, however, forms no part of the present invention and is merely shown to aid in the illustration of the operation of this device.

Heretofore in many arts it has been found necessary to feed a blank to a machine for operation, and many attempts have been made to devise an automatic feed mechanism adapted to deliver blanks one by one to the machine with the requisite rapidity and accuracy of adjustment in operative position. None of these devices have been successful in all respects, and it is a matter of familiar knowledge that in most instances at the present time blanks of any kind are fed manually into the machine designed to operate on them. One common fault in most feed mechanisms heretofore devised is that frequently two blanks or more are fed instead of one, thereby causing loss of material and imperfect work.

The object of my invention is to provide a simple and reliable automatic feed mechanism adapted to feed blanks of any kind to a desired machine one by one at any desired rapidity and in so feeding to adjust the same accurately for operation.

The invention consists of the matters hereinafter described, and more fully pointed out and defined in the appended claims.

In the drawings, Fig. 7 is a section taken on line 7 7 of Fig. 4. Fig. 10 is a similar sectional view showing the valve closed.

Figure 5:
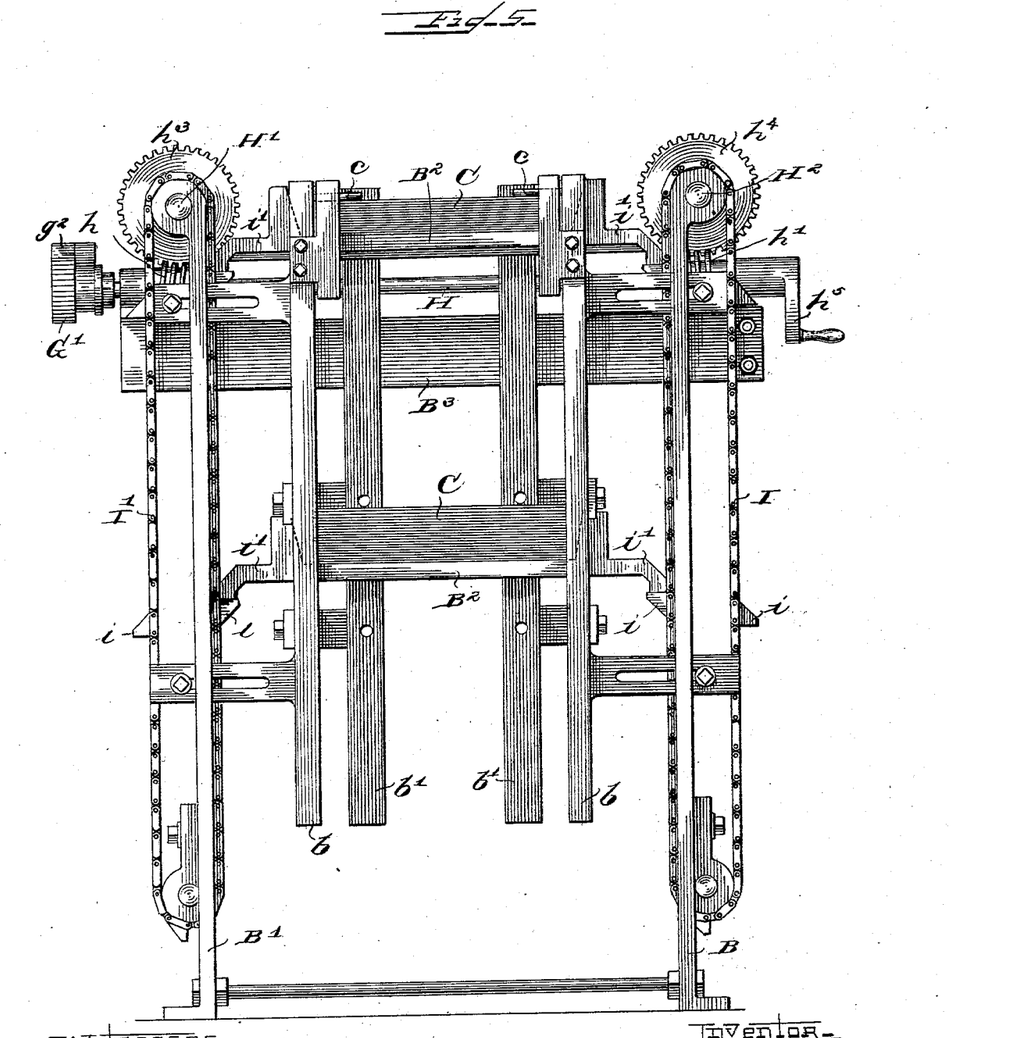
Fig. 5 is an end elevation of a device embodying my invention with parts of the same omitted.

As shown in said drawings, A indicates as whole a machine of any desired kind adapted to receive the blanks from the feed mechanism. The feed mechanism is located in close proximity to the machine A and may be constructed as a part thereof; but in the construction shown it is supported on the uprights or standards B and B', to which are secured ways $b$ $b$ $b'$ $b'$, as shown in Fig. 5, between which is supported a carrier $B^2$, designed to support the blanks C and feed the same upwardly to the feed mechanism. $B^3$ indicates a transverse frame member rigidly bolted to the inner side of the uprights B and B', respectively, as shown, and provided with a forwardly-directed rigid arm $B^4$, which projects to a point above the receiving end of the machine to which the blanks are to be fed. Journaled to the outer end of the arm $B^4$ is the shaft D, one end of which is supported upon the longitudinal frame member E, which, as herein shown, is rigidly connected with the can-body machine, but which obviously need not be a part thereof nor connected therewith, inasmuch as the feed mechanism may be an entirely independent and separate machine. Said longitudinal frame member E is provided on its upper surface with longitudinal guide-bars $e$ $e$, forming between the same a slideway adapted to hold the rack-bar E', which reciprocates longitudinally of said frame member, from lateral movement. Means are provided for reciprocating said rack-bar, comprising the coacting bevel-gears $e'$ and $e^2$. journaled on the frame, one of which, $e'$, is secured on the same shaft with a sprocket or spur-wheel $e^3$ and is operatively connected with and may be driven from the mechanism of the machine to which it is desired to feed the blank. The rate at which said blanks are fed thereto may be thus regulated automatically to the speed of the receiving-machine. The shaft on which the said bevel-gear $e^2$ is secured is provided at its inner end with a crank $e^4$ and which engages one end of a connecting-rod $e^5$, the other end of which engages the end of said rack-bar. The shaft D has rigidly secured thereon a pinion $d^8$, located in position to intermesh with said rack-bar and designed to give to said shaft D intermittent rotation in opposite directions from the movements of said rack-bar. Rigidly secured on the shaft D are the arms $d$ $d'$, and journaled in the upper ends of said arms is the shaft D', on which is supported centrally of the same the vacuum-cup, hereinafter more fully described.

Figure 1:
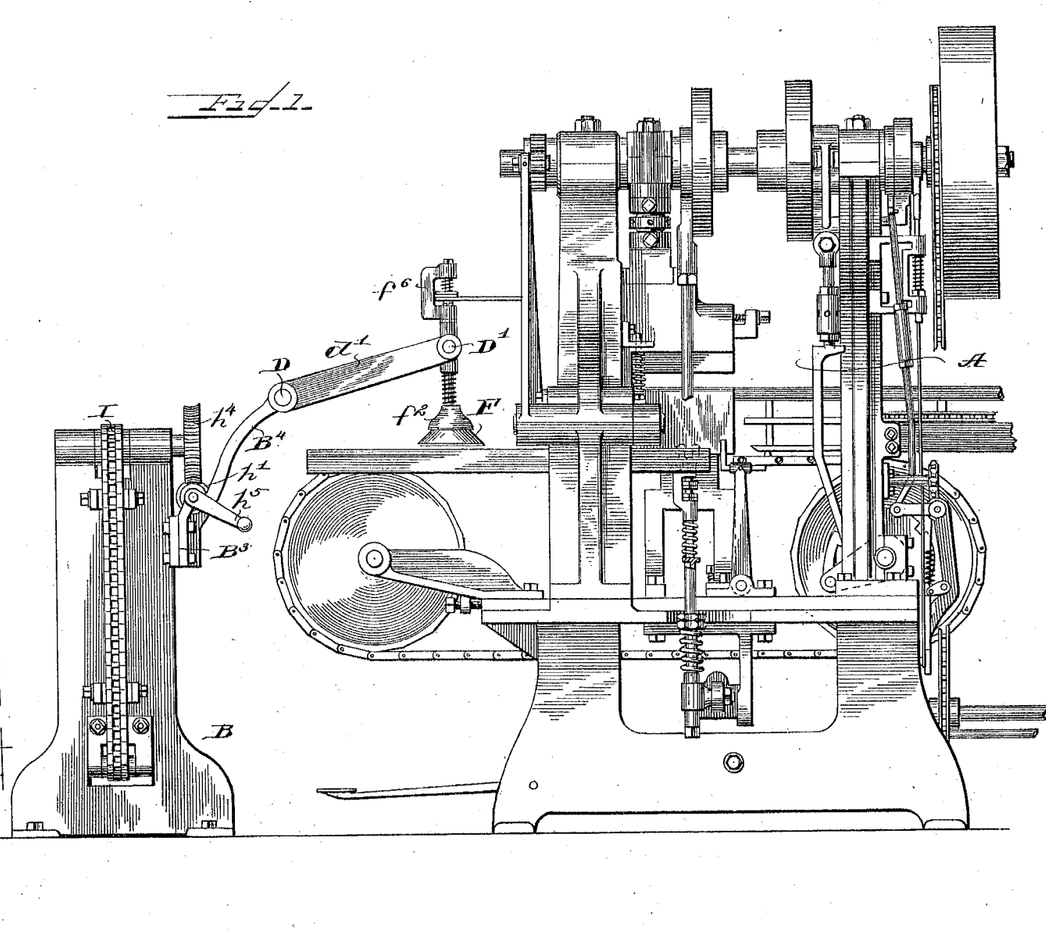
Figure 1 is a side elevation of a device embodying my invention with parts omitted and showing the same in relation to a machine adapted to receive the blanks therefrom.
Figure 2:
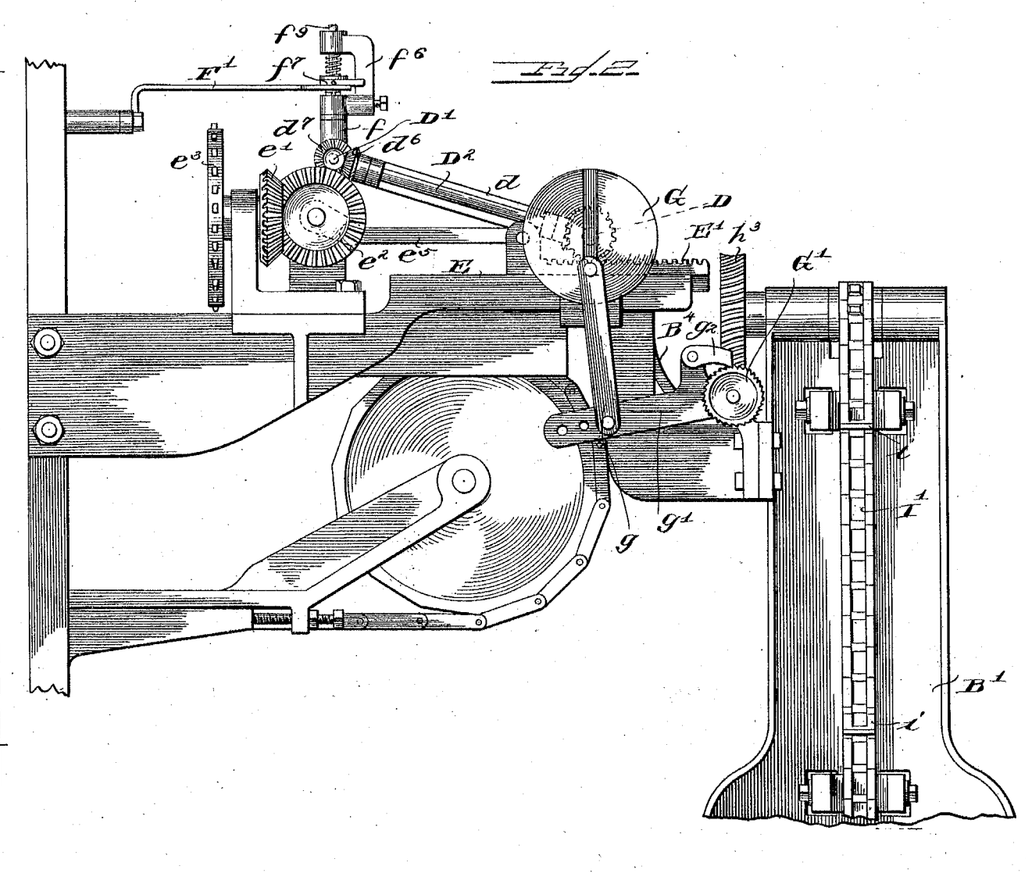
Fig. 2 is a view of the side opposite to that shown in Fig. 1.
Figures 3, 4:
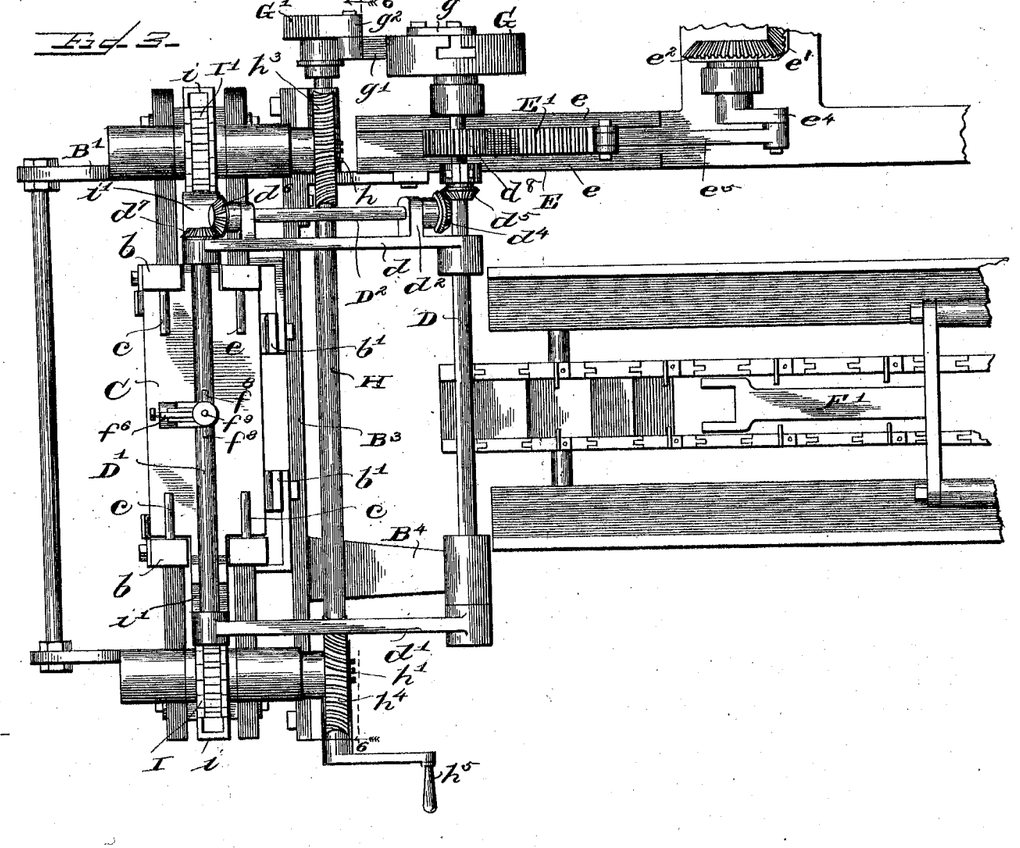
Fig. 3 is a top plan view showing the parts in position to pick up a blank.
Fig. 4 is a similar top plan view showing the parts in position to adjust the blank in the receiving-machine.
Figure 4:
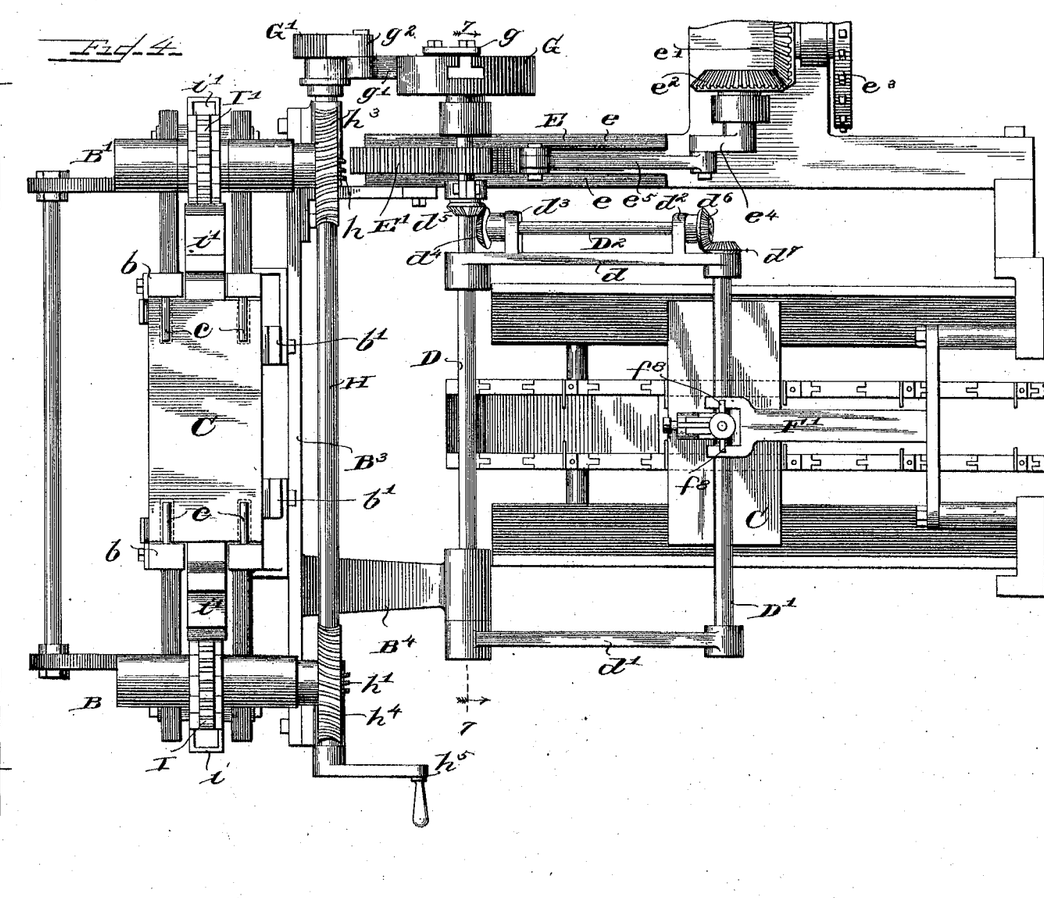

Means are provided for rotating the shaft D' sufficiently to cause said vacuum-cup at all times to retain its operative position vertically beneath the same, as indicated in Figs. 1, 3, and 4. Said means comprise a shaft $D^2$, journaled parallel with the arm $d$ in lugs or projections $d^2$ $d^3$ and provided at its lower end adjacent to the shaft D with a beveled gear $d^4$, which intermeshes with a non-rotative beveled gear $d^5$, secured on the frame member E, concentric with the shaft D. The outer end of said shaft $D^2$ is also provided with a beveled gear $d^6$, intermeshing with a beveled gear $d^7$ on the shaft D'. Obviously from the construction described the rotation or partial rotation of the shaft D by the rack-bar E' acts to swing the arms $d$ $d'$ and the shaft D' and parts secured thereon forwardly over the standards B B' in position to pick up one of the blanks C, as shown in Fig. 3, while the opposite movement of the rack-bar moves said parts rearwardly. Such movements of the said carrying means serve to roll the bevel-gear $d^4$ partly around the bevel-gear $d^5$, thereby partly rotating the shaft $D^2$ and shaft D'. Said gears are of such size and so adjusted that the rotation of said shaft D' is only sufficient to hold the vacuum mechanism vertically beneath the same during such forward and rearward movements.

Figure 9:
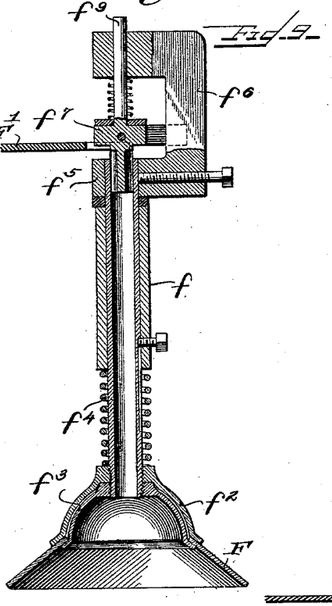
Fig. 9 is a section taken on line 9 9 of Fig. 7.
Figure 10:
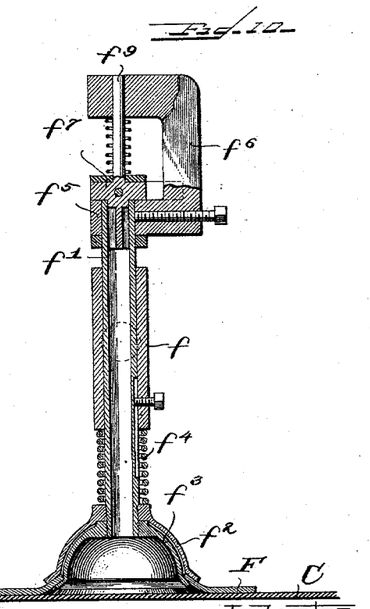

The vacuum or lifting mechanism, as shown, consists of a sleeve $f$, rigidly connected with the central part of the shaft D', which, as shown, consists of two parts which abut on opposite sides of the sleeve. Within said sleeve $f$ is secured the tubular member $f'$, which is of greater length than the sleeve $f$ and extends below and above the same, and the downwardly-opening concentric cups $f^2$ $f^3$ have screw-threaded engagement therewith at said lower end. Between said cups is secured the conical ring of rubber or other resilient material F, which opens downwardly and comprises the means for producing the vacuum in said vacuum-cup, by downward pressure of said ring on the blanks. Between the upper surface of the cup $f^2$ and the sleeve $f$ is the spiral spring $f^4$, which serves to hold the tubular member $f'$ at its lowermost position within the sleeve $f$, as indicated in Fig. 9, but which permits said tubular member to slide upwardly within said sleeve when the suction-ring F is brought down upon a blank, as indicated in Fig. 10. As shown, said tubular member is grooved longitudinally and a set-screw is provided in the sleeve $f$, the inner end of which extends into said groove and prevents said tubular member from rotation therein. The upper end of said tubular member $f'$ is provided with a head $f^5$, rigidly secured thereon and having on one side of the same a bracket $f^6$, the upper end of which extends to a point in vertical alinement above the tubular member $f'$. A valve, herein shown as a check-valve, is secured in the upper end of said tubular member and is provided with laterally-projecting pins or projections $f^8$ $f^8$, designed, when in the discharging position, to be engaged by the arms of a bracket F', as shown, rigidly secured on the receiving-machine and projecting over the part on which the blanks are to be deposited. For the purpose of insuring positive action of said sleeve a valve-stem $f^9$ extends through the bracket-arm $f^6$ and a spring is secured thereon, acting to hold said valve normally closed.

Figure 6:
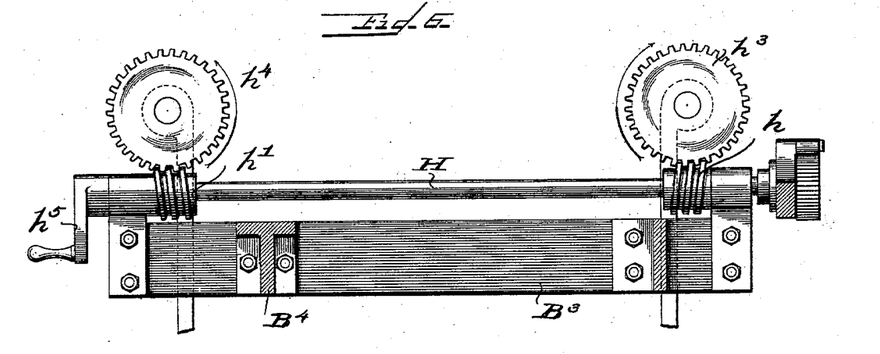
Fig. 6 is a fragmentary section taken on line 6 6 of Fig. 3.
Figure 7:
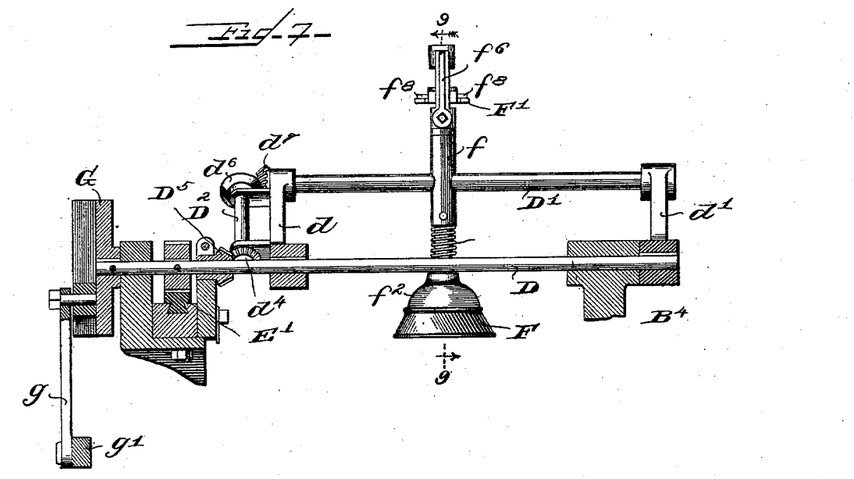
Figure 8:
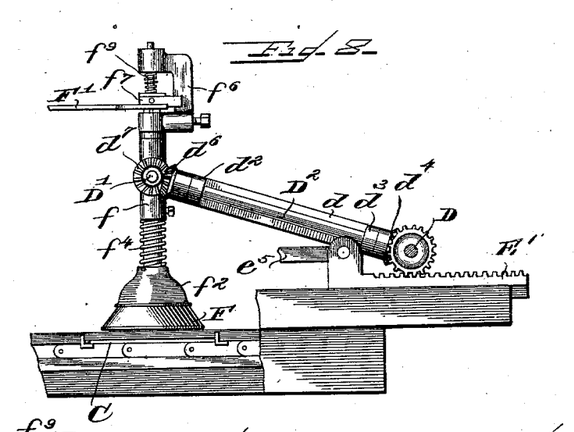
Fig. 8 is a fragmentary detail of the carrying mechanism, showing the same immediately after release of the blank.

Obviously it is desirable that the blank placed on the carrier $B^2$ be fed upwardly to the feeding mechanism at a uniform rate of speed, said speed of upward movement being regulated by the feed of the blanks to the receiving-machine. For this purpose I have provided mechanism as follows: A face-plate G is rigidly secured at the end of the shaft D adjacent to the longitudinal frame member E. Said face-plate is slotted diametrically and a wrist-pin adjustably secured therein providing means for adjusting the stroke of the connecting-rod $g$, one end of which engages said wrist-pin and the other end of which engages the lever $g'$, which is pivoted on a shaft H, journaled on the transverse frame member $B^3$ and provided with a pawl $g^2$, which engages a ratchet G', rigidly secured on said shaft. Said shaft H is provided at its opposite ends adjacent to the standards B and B', respectively, with the right and left worms $h$ $h'$. At the top of each of the standards B and B' are journaled the shafts H' $H^2$, extending transversely of the shaft H. Said shafts are each provided, respectively, at their inner ends with gears $h^3$ $h^4$, each of which is in operative engagement with one of the worms $h$ $h'$ on the shaft H, as indicated in Figs. 5 and 6. Said shafts H' $H^2$ are each provided centrally of the same with a sprocket-wheel, over which pass the endless chains I and I', respectively. Said chains also are trained about pulleys or sprocket-wheels journaled at the lower end of each of the respective standards. Said sprocket-chains are provided along their lengths with a plurality of outwardly-projecting brackets $i$ and are so adjusted with respect to each other that corresponding brackets occupy corresponding positions on each chain and are at the same level. The carrier $B^2$ is provided at each end with the longitudinally-extending arm $i'$, designed to be engaged on the brackets $i$ in the chains and which acts to move said carrier with its load of blanks upwardly.

The operation of my device is as follows: The machine being adjusted to correspond with the requirements of a mechanism to which the blanks are to be delivered, the rack-bar E' is reciprocated from said receiving mechanism along the frame member E, with the effect of rotating the shaft D, as before described, and bringing the vacuum-cup down upon the blanks with sufficient impact to compress the ring F and cause the escape of a portion of the air within the vacuum-cup and tubular member through the valve $f^7$. The valve immediately closes, and the rack-bar is now in position to be reciprocated forwardly, with the effect of causing the shaft D to rotate oppositely, carrying the arms, together with the shaft D', over to the discharge position, the sleeve $f$ retaining a vertical position with the blank C, supported by atmospheric pressure beneath the vacuum-cup. When this movement is nearly completed, the projections $f^8$ $f^8$ on the valve $f^7$ are engaged by the arms on the bracket F' and the continued rotation of the shaft D and downward movement of the vacuum-cup and sleeve serve to lift said valve, permitting the entry of air into the vacuum-chamber and allowing the blank to be deposited upon the machine in the desired position. The release of the blank occurs at approximately the time that the rack-bar has completed its forward movement and is about to be retracted beneath the pinion, with the effect of bringing the arms $d$ $d'$ forwardly again in position to take up another blank. The reciprocation of said rack-bar and consequent intermittent revolutions of the shaft D and correspondent movement of the face-plate G on the end of the reciprocating lever $g'$ and by means of the pawl and ratchet rotates the shaft H continuously while the machine is in operation, and the rate of rotation of said shaft H may be regulated to correspond with any desired speed of the feeding mechanism by means of the adjustable connection of the connecting-rod $g$ with the face-plate G. The worms $h$ $h'$ being right and left worms, respectively, the gears $h^3$ $h^4$ and the shafts on which the same are secured rotate oppositely, with the effect that the inner side of the sprocket-chains move in the same direction—that is to say, upwardly—while the outer sides thereof move downwardly. It follows that when a carrier having a desired number of blanks C thereon is placed between the ways $b$ $b$ $b'$ $b'$, with the arms $i'$ $i'$ supported on the bracket $i$ $i$ of the chain, as indicated in Fig. 5, said carrier with the blanks thereon will be fed continuously and uniformly upward during the operation of the machine. Said carriers when the blanks have been removed therefrom by the vacuum-feed mechanism may be removed from the ways and the next succeeding carrier, with the blanks thereon, moved into position. For the purpose of facilitating the movement of such next succeeding carrier the shaft H is provided at one end with a crank $H^5$, whereby when the uppermost carrier is moved said gears $h^3$ $h^4$ may be made to turn very rapidly, with the effect of quickly elevating the next succeeding blanks into operative position, after which the machine operates automatically, as before.

Heretofore in blank-feeding devices a serious difficulty has been experienced in providing means for lifting but a single blank at a time. For the purpose of securing this end I have provided on the ways $b$ $b$ at the top of the same the inwardly-directed pins or studs $c$ $c$. As shown, there are four of such pins, two on each side of the machine, which are designed to engage each end of the blank, on each margin thereof, so that when a blank is lifted centrally by the vacuum-cup said pins engage and retard the ends of the same. The central part of the blank is thus bowed upwardly, and the next succeeding blank is sprung away from the same. Obviously, if preferred, instead of employing the vacuum-cup, as described, an air-pump may be connected through the shaft D', which may be tubular for that purpose with the interior of the vacuum apparatus, and means may be provided for creating the vacuum through the action of the pump.

Many of the details or features of construction illustrated and above described are not essential to the carrying out of the broad features of my invention when separately considered. The scope of the invention will be set forth in the concluding claims, and it is to be understood that the omission of an element or the omission of the particular feature of any of the elements mentioned in any given claim is intended to be a formal declaration of the applicant that the omitted elements or features are not essential to the invention therein covered.

I claim as my invention—

1. The combination with a machine to be fed, of an endless conveyer adapted to move a stack of blanks upwardly to feeding position, means for supporting said conveyer, means operated by pneumatic pressure adapted to engage said blanks by impact and to adjust the same one by one in the receiving-machine and means for releasing said blanks from the carrier when so adjusted.

2. In a machine of the class described, the combination with a rock-shaft, of an arm secured thereon, a vacuum-cup carried by said arm, means acting to prevent the inversion of said vacuum-cup, an endless-chain conveyer, means acting to oscillate said arm and vacuum-cup into position to engage and lift a blank from said conveyer and carry it to a discharge position and means for releasing the blank therefrom.

3. The combination with an endless-chain conveyer of an oscillating arm, a sleeve secured thereon, a vacuum-cup movably secured in said sleeve, means adapted to retain said vacuum-cup at all times in a vertical position independent of the position of the arm and means for oscillating said arm to bring said cup into engagement with a blank on said conveyer and to swing the same with a blank to a discharging position.

4. The combination with an endless-chain conveyer, of a rack-bar, a horizontal shaft operated thereby, a radial arm rigidly secured on said shaft, a sleeve secured thereon, a vacuum-cup movably secured in said sleeve and adapted to receive partial rotation about said shaft, means adapted to hold said cup in a vertical position during said rotation, and means for exhausting the air from the cup by the impact of its engagement with the blank.

5. The combination with a frame, of oppositely-movable conveyers therein, a horizontal shaft journaled in said frame, means adapted to impart a partial rotation to said shaft, a radial arm rigidly secured on the shaft, a swinging vacuum-cup therein means for holding the cup vertically during the rotation of the shaft, means for producing a vacuum in said cup operated solely by impact thereof on a blank in said conveyers and means for discharging the blank when the cup is at the limit of its movement from said conveyers.

6. In a device of the class described the combination with a supporting-frame of endless-chain conveyers carried thereon, means for moving a plurality of blanks upwardly therein, a feed mechanism comprising a rock-shaft journaled transversely in said frame, an arm rigidly secured on said rock-shaft, means operated from a receiving-machine acting to actuate said rock-shaft and means secured on said arm and operated by atmospheric pressure for engaging said blank and feeding the same singly to said receiving-machine.

7. In a device of the class described, the combination with a frame of an endless-chain, lugs on said chain, tables adapted to be engaged thereby and carry a plurality of blanks into position for engagement, of a feed mechanism, a rock-shaft, an arm rigidly secured thereon, means operated from the receiving-machine for actuating said rock-shaft and arm, means carried on said arm and operated by atmospheric pressure for successively engaging said blank and feeding the same singly to the receiving-machine and means carried on said receiving-machine acting to release each blank from the feed mechanism when adjusted in position on the receiving-machine.

8. In a machine of the class described, the combination with the frame, of a rock-shaft journaled thereon, an arm rigidly secured on said rock-shaft, automatic carrying means journaled at the extremity of said arm and operated by pneumatic pressure, means for oscillating said rock-shaft operated from a receiving-machine and means also operated from the receiving-machine acting to hold said automatic carrying means at all times in a vertical position.

9. In a machine of the class described, the combination with a supporting-standard, of means for moving a plurality of blanks into position to be engaged by the carrying means and means also supported on said frame for engaging said blanks when lifted and acting to spring said blanks thereby separating the blank engaged from the succeeding blanks.

10. In a machine of the class described, the combination with automatic feeding mechanism, of a supporting-frame, ways secured thereon, chain conveyers movable in said ways, means journaled in the frame acting to move said conveyers oppositely and acting normally to move a plurality of blanks into position to be engaged by the feeding mechanism, means acting to separate succeeding blanks from that engaged by the feeding means, said feeding means and the means for moving the blanks thereto being operated from a receiving-machine.

11. In a machine of the class described the combination with a feed mechanism operated by atmospheric pressure, of a supporting-frame, a shaft journaled therein, a right and left worm carried on said shaft, an endless-chain conveyer carried on each worm and adapted to move a plurality of blanks upwardly to the feed mechanism, said conveyers and feed mechanism actuated from a receiving-machine and said conveyer being provided with means for actuating the same manually.

12. In a machine of the class described means for moving a plurality of blanks upwardly to a feed mechanism comprising a supporting-frame, ways secured thereon, a removable carriage secured between said ways and endless-chain conveyers engaging said carriage at each end thereof and moving the same upwardly into operative position said means being actuated normally from a receiving-machine and means adapted to be actuated manually for accelerating the upward movement of said carriage.

13. In a machine of the class described, means for moving a plurality of blanks into a position to be fed comprising oppositely-driven sprocket-chains on each side of a supporting-frame, a carriage adapted to be actuated by said chains, means for driving said chains normally comprising a shaft adapted to be rotated from a receiving-machine, interacting means on said shaft and the chain-driving shafts and a crank adapted to be normally actuated on said first-mentioned shaft.

14. In a machine of the class described means for moving a plurality of blanks upwardly into position to be fed comprising a supporting-frame, a shaft journaled on each side of the same and adapted to actuate oppositely-movable sprocket-chains, a carriage adapted to support the blanks and to be moved upwardly by said chains, gears on said shafts and worms driven from a machine coacting with said gears.

15. In a machine of the class described the combination with a support for a plurality of blanks of a feed mechanism comprising a rock-shaft, arms pivoted thereon, a vacuum-cup movably supported from said arms, means operated from a receiving-machine for oscillating said arms and cup into engagement with a blank and into position to deposit the same in said receiving-machine and means for holding said vacuum-cup vertically during such oscillation comprising a shaft journaled on one of said arms parallel therewith and provided on its extremity with bevel-gears one of which engages a non-rotative bevel-gear on the frame the other of which engages a bevel-gear rigidly connected with the vacuum-cup.

16. In a machine of the class described, the combination with an oscillating vacuum-cup adapted to lift a blank from a package of the same and swing the same to a receiving-machine, means operated from the receiving-machine for oscillating the vacuum-cup comprising a longitudinally-movable rack-bar, a plurality of cogs on its upper surface adapted to engage a coacting pinion acting to drive the feed mechanism.

17. In a machine of the class described the combination with a supporting-frame, of a feed mechanism secured on said frame comprising a transverse rock-shaft, rigid arms thereon provided at their outer ends with means for engaging rigidly a blank, means for oscillating said arms comprising a reciprocating rack-bar operated from a receiving-machine, a pinion on said rock-shaft adapted to be engaged by said rack-bar and means also operated from said receiving-machine for moving the blanks upwardly into position to be engaged comprising a reciprocating rod driven from said rock-shaft and acting to rotate the elevating mechanism.

18. In a machine of the class described, means for moving a plurality of blanks upwardly into position to be fed comprising rotatable right and left worms, a rock-shaft having secured thereon a feed mechanism, a pinion on said rock-shaft, a rack-bar engaging said pinion, said rock-shaft being provided at its extremity with an adjustable reciprocating connecting-rod operatively engaging a lever provided with a pawl, a ratchet operatively connected with said worms and engaged by the pawl whereby the reciprocation of said rack-bar acts to oscillate said rock-shaft and rotates said worms.

19. In a machine of the class described, a vacuum-cup, a resilient margin therefor, a hollow stem connected therein, a spring-actuated valve at the top of said stem adapted to be lifted as the air is compressed within said vacuum-cup and means on said valve adapting the same to be lifted thereby permitting the escape of air from said cup when in its raised discharging position and a spring-actuated, longitudinally-movable, sleeve on said stem.

20. In a device of the class described, a vacuum feed mechanism comprising an outer cup, an inner cup complemental therewith, a resilient flange or ring rigidly engaged between the margins of said cups, a hollow extensible stem connected with said cup, a spring acting to hold said stem normally in its extended position, a valve at the top of said stem adapted to be lifted when the air is compressed within said cup by impact upon a blank or the like and adapted to close automatically when the pressure is equalized, and a projection on said valve adapted to be engaged by a part on a receiving-machine when the device is swung to the discharging position.

In witness whereof I have hereunto subscribed my name in the presence of two subscribing witnesses.

ARNOLD D. COLEMAN.

Witnesses:
C. W. HILLS,
LOUIS J. DELSON.